US006995599B2

(12) United States Patent
Huang et al.

(10) Patent No.: US 6,995,599 B2
(45) Date of Patent: Feb. 7, 2006

(54) CROSS-CONDUCTION BLOCKED POWER SELECTION COMPARISON/CONTROL CIRCUITRY WITH NTC (NEGATIVE TEMPERATURE COEFFICIENT) TRIP VOLTAGE

(75) Inventors: Jin-Biao Huang, Amherst, NH (US); Robert Neidorff, Bedford, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/649,226

(22) Filed: Aug. 26, 2003

(65) Prior Publication Data
US 2005/0046461 A1    Mar. 3, 2005

(51) Int. Cl.
*H03K 17/62*    (2006.01)
(52) U.S. Cl. .................................. 327/408
(58) Field of Classification Search ............... 327/407, 327/408, 409, 410, 411, 412, 413
See application file for complete search history.

(56) References Cited

U.S. PATENT DOCUMENTS

| | | | | |
|---|---|---|---|---|
| 3,502,905 A | * | 3/1970 | Bicking ...................... | 327/65 |
| 4,617,473 A | * | 10/1986 | Bingham ..................... | 307/66 |
| 5,157,291 A | * | 10/1992 | Shimoda ..................... | 327/408 |
| 5,187,396 A | * | 2/1993 | Armstrong et al. ........... | 327/65 |
| 5,272,393 A | * | 12/1993 | Horiguchi et al. ........... | 327/535 |
| 5,426,386 A | * | 6/1995 | Matthews et al. ............ | 327/63 |
| 5,703,415 A | * | 12/1997 | Tanaka ....................... | 307/66 |
| 5,712,590 A | * | 1/1998 | Dries et al. ................. | 327/539 |
| 6,002,295 A | * | 12/1999 | Gens et al. .................. | 327/546 |
| 6,118,680 A |   | 9/2000 | Wallace et al. ............... | 363/71 |
| 6,281,724 B1 | * | 8/2001 | Ellis .......................... | 327/143 |
| 6,359,497 B1 | * | 3/2002 | Criscione .................... | 327/408 |
| 6,493,243 B1 |   | 12/2002 | Real .......................... | 363/17 |
| 6,522,190 B1 |   | 2/2003 | Malik et al. ................. | 327/408 |
| 6,642,750 B1 | * | 11/2003 | Egan .......................... | 327/63 |

* cited by examiner

Primary Examiner—Jeffrey Zweizig
(74) Attorney, Agent, or Firm—W. Daniel Swayze, Jr.; W. James Brady; Frederick J. Telecky, Jr.

(57) ABSTRACT

Power selection circuitry that may be employed in redundant power supplies. The power selection circuitry includes a comparator, a symmetric resistor array coupled between the comparator inputs and multiple input voltage sources, a plurality of first switching elements, and control logic/drive circuitry coupled between the comparator output and the first switching elements. The first switching elements connect a selected input voltage source to a load. The comparator compares the voltage levels of the respective voltage sources, and provides a voltage indicating which one of the voltage sources is operational to the control logic/drive circuitry, which applies control signals to the first switching elements to connect the operational voltage source to the load. The symmetric resistor array and a plurality of second switching elements assure that symmetric trip voltages with hysteresis are provided to the comparator. The power selection circuitry may be employed in a redundant power supply to block the cross-conduction of current between the multiple input voltage sources, to reduce current spikes during power selection switching, and to satisfy NTC trip voltage requirements of the switching elements connecting the input voltage sources to the load.

24 Claims, 4 Drawing Sheets

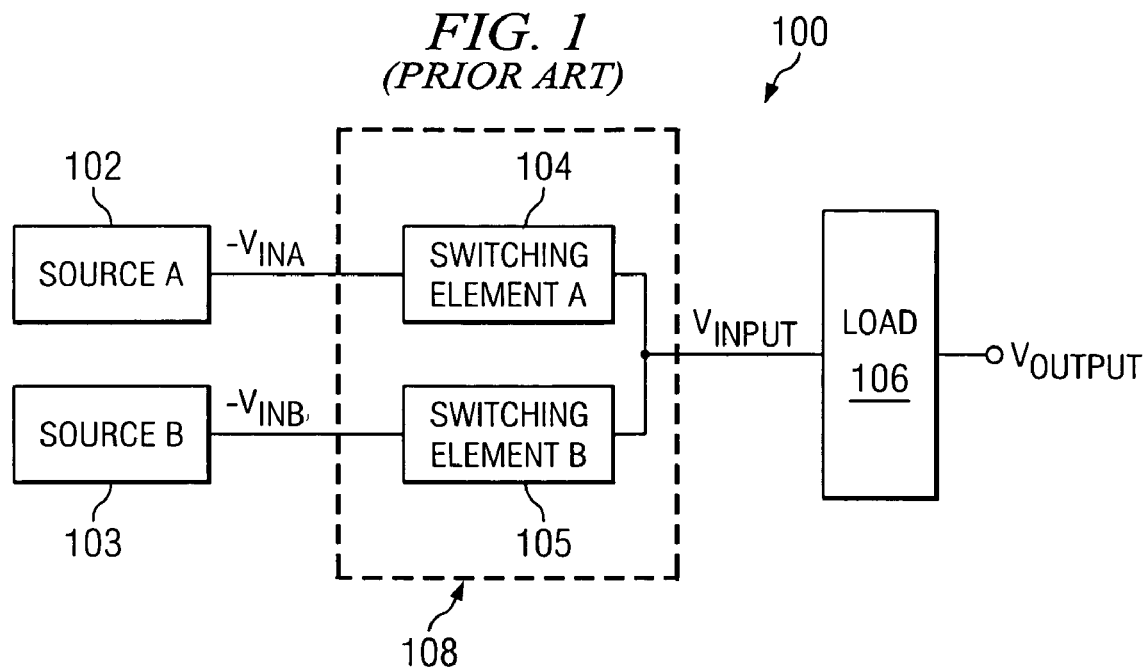
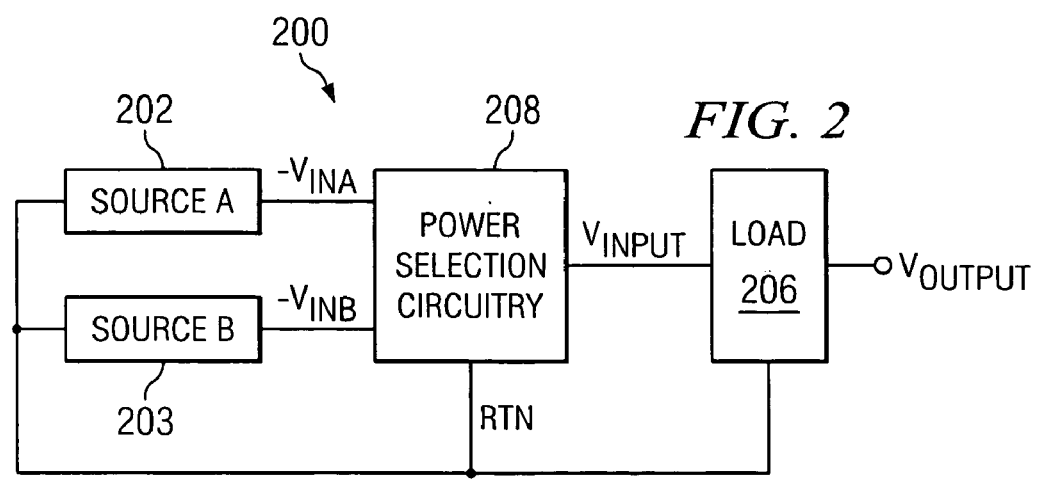

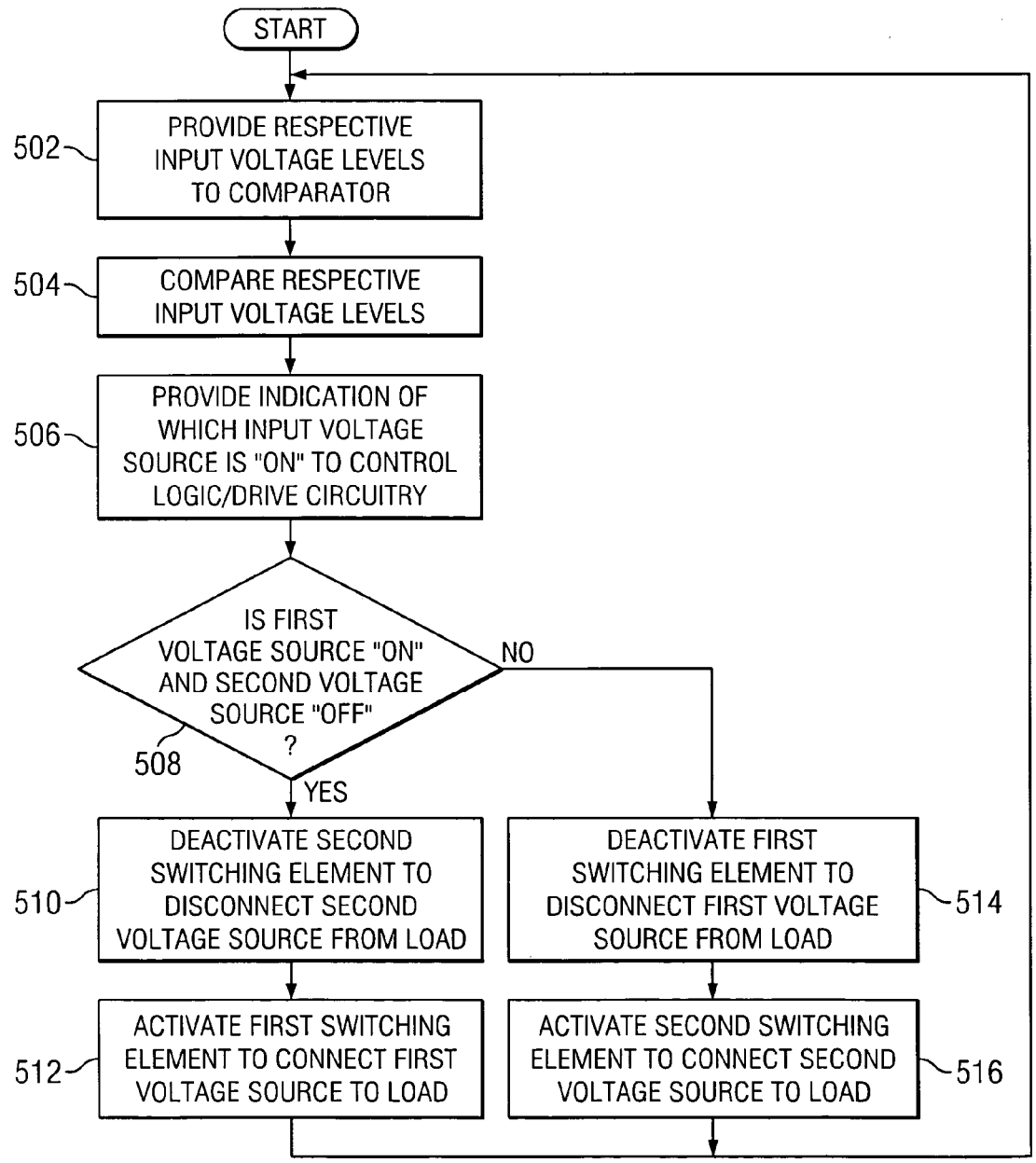

CROSS-CONDUCTION BLOCKED POWER SELECTION COMPARISON/CONTROL CIRCUITRY WITH NTC (NEGATIVE TEMPERATURE COEFFICIENT) TRIP VOLTAGE

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present application relates generally to power supplies, and more specifically to power selection circuitry that may be employed in redundant power supplies.

Redundant power supplies are known that are capable of providing multiple input voltage sources to a load to assure that power continues to be provided even when one of the input voltage sources fails. For example, a conventional redundant power supply may comprise first and second input voltage sources, and power selection circuitry including first and second switching elements selectively connecting the first and second voltage sources, respectively, to a load. In a typical mode of operation, when the first voltage source is operational and the second voltage source is not fully operational, the first switching element is activated to connect the first voltage source to the load and the second switching element is deactivated to disconnect the second voltage source. Similarly, when the second voltage source is operational and the first voltage source is not fully operational, the second switching element is activated to connect the second voltage source to the load and the first switching element is deactivated to disconnect the first voltage source.

One drawback of the above-described conventional redundant power supply is that the power selection circuitry employed therein may allow cross-conduction of current to occur between the multiple input voltage sources. For example, when the first switching element is activated to connect the first voltage source to the load and the second switching element is ostensibly deactivated, the second switching element may allow at least some current to flow back to the second voltage source, thereby causing the second voltage source to become a sink and possibly leading to an overload of the second voltage source. Similarly, when the second switching element is activated to connect the second voltage source to the load and the first switching element is ostensibly deactivated, the first switching element may allow at least some current to flow back to the first voltage source, possibly causing an overload condition at the first voltage source. Moreover, the conventional redundant power supply has other drawbacks, e.g., the power selection circuitry is often susceptible to load current spikes when the switching elements are activated to connect selected ones of the multiple voltage sources to the load.

It would therefore be desirable to have power selection circuitry usable in redundant power supplies that avoids the drawbacks of the above-described conventional circuitry.

BRIEF SUMMARY OF THE INVENTION

In accordance with the present invention, improved power selection circuitry is provided that may be employed in redundant power supplies. The presently disclosed power selection circuitry blocks the cross-conduction of current between multiple input voltage sources, reduces the occurrence of load current spikes during power selection switching, and satisfies Negative Temperature Coefficient (NTC) trip voltage requirements of switching elements included therein.

In one embodiment, the power selection circuitry includes a comparator, a symmetric resistor array coupled between the inputs of the comparator and a plurality of input voltage sources, a plurality of first switching elements, and control logic/drive circuitry coupled between the comparator output and the plurality of first switching elements. The first switching elements are configured to connect a selected one of the input voltage sources to a load. The comparator is configured to compare the voltage levels of the respective voltage sources, and to provide a voltage indicating which one of the voltage sources is operational to the control logic/drive circuitry, which subsequently applies control signals to the first switching elements to connect the operational voltage source to the load. The symmetric resistor array in conjunction with a plurality of second switching elements is configured to assure that symmetric trip voltages with hysteresis are provided to the inputs of the comparator. The power selection circuitry further includes a plurality of diodes configured to block the cross-conduction of current between the input voltage sources through the symmetric resistor array. The control logic/drive circuitry comprises cross-coupled logic circuits each including a plurality of logic gates having relatively strong pull-down and relatively weak pull-up characteristics to assure that a selected one of the first switching elements is activated only after the remaining first switching elements are fully deactivated, thereby reducing the cross-conduction of current between the input voltage sources through the first switching elements. The plurality of logic gates is further configured to reduce load current spikes when activating the first switching elements. The power selection circuitry further includes an NTC band-gap reference configured to track the temperature coefficients of parasitic body diodes within the first switching elements to assure that the power selection circuitry satisfies the NTC trip voltage requirements of the first switching elements.

By providing power selection circuitry that blocks the cross-conduction of current between multiple input voltage sources, reduces load current spikes during power selection switching, and satisfies NTC trip voltage requirements of switching elements connecting the input voltage sources to a load, electrical and electronic devices such as redundant power supplies can be designed that avoid the drawbacks of corresponding conventional devices.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 1 is a block diagram of a redundant power supply including conventional power selection circuitry;

FIG. 2 is a block diagram of a redundant power supply including power selection circuitry according to the present invention;

FIG. 5 is a flow diagram of a method of operating the power selection circuitry of FIG. 2.

DETAILED DESCRIPTION OF THE INVENTION

Figure 3:
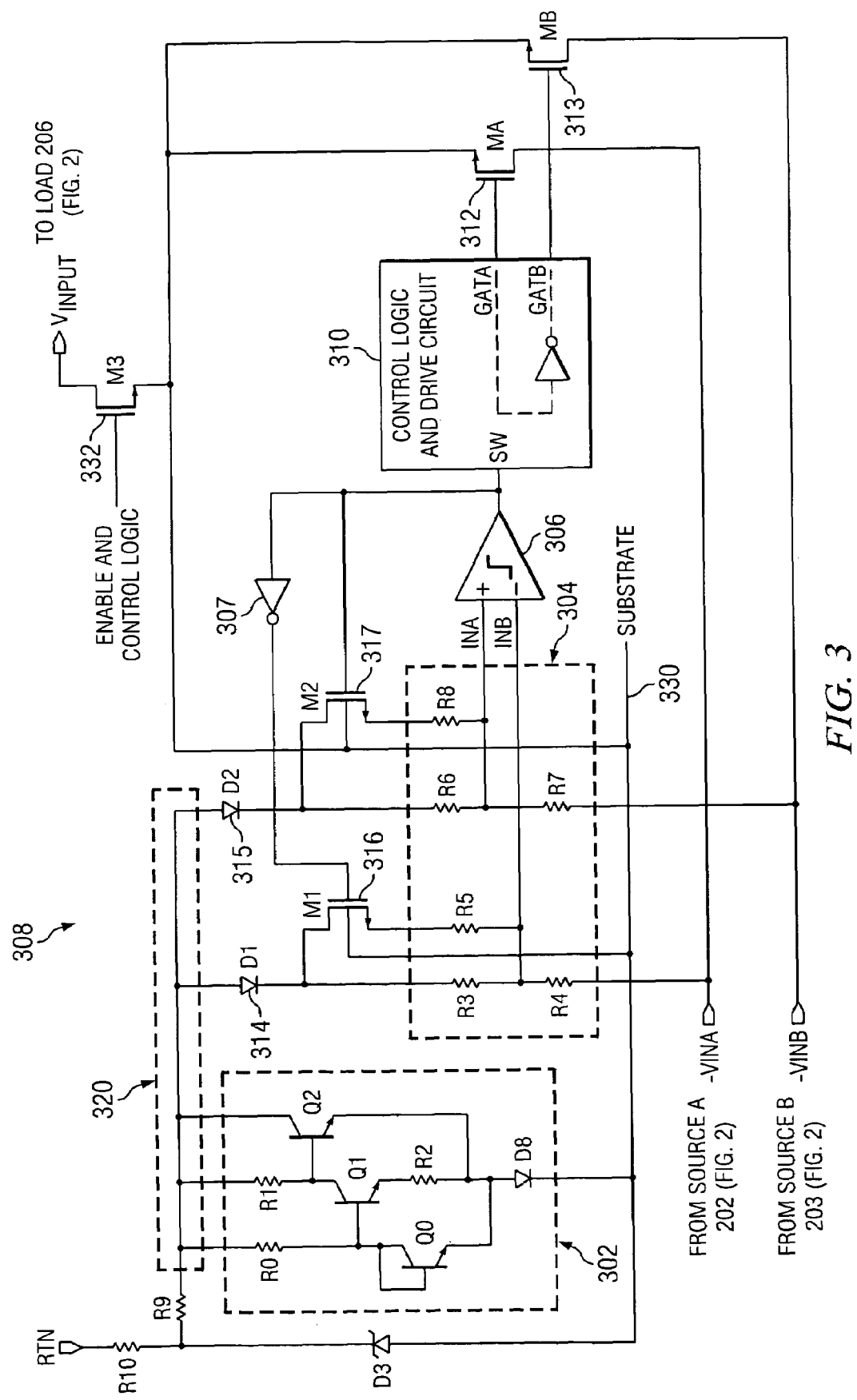
FIG. 3 is a schematic of the power selection circuitry of FIG. 2.

Improved power selection circuitry is disclosed that may be employed in electrical and electronic devices such as redundant power supplies. The presently disclosed power selection circuitry is configured to block the cross-conduction of current between multiple input voltage sources, to reduce the occurrence of load current spikes during power selection switching, and to satisfy Negative Temperature Coefficient (NTC) trip voltage requirements of switching elements included therein.

FIG. 1 depicts a conventional redundant power supply 100, which comprises a plurality of input voltage sources A–B 102–103, and power selection circuitry 108 including switching elements A–B 104–105 for connecting the voltage sources A–B 102–103 to a load 106. For example, the load 106 may comprise a DC—DC regulator. In a typical mode of operation, when the voltage source A 102 is operational and the voltage source B 103 is not fully operational, the switching element A 104 is activated to connect the voltage source A 102 to the load 106 and the switching element B 105 is deactivated to disconnect the voltage source B 103 from the load 106. As a result, the power selection circuitry 108 provides an input voltage $V_{INPUT}=-V_{INA}$ to the load, which generates a corresponding regulated output voltage $V_{OUTPUT}$.

It should be appreciated that when the voltage source B 103 is operational and the voltage source A 102 is not fully operational, the switching element B 105 is activated to connect the voltage source B 103 to the load 106 and the switching element A 104 is deactivated to disconnect the voltage source A 102 from the load 106, thereby providing an input voltage $V_{INPUT}=-V_{INB}$ to the load 106, which generates a regulated output voltage $V_{OUTPUT}$ corresponding thereto.

Because during the activating/deactivating period the switching elements A–B 104–105 may allow at least some current to flow back to the voltage sources A–B 102–103, respectively, while the other switching element is activated to provide power to the load 106, an unwanted overload condition may result at one of the voltage sources A–B 102–103. Moreover, the load, especially the capacitive load, controlled by the power selection circuitry 108 of the conventional redundant power supply 100 may be susceptible to undesirable current spikes when the switching elements A–B 104–105 are activated to connect a selected one of the voltage sources A–B 102–103 to the load 106.

FIG. 2 depicts an illustrative embodiment of a redundant power supply 200 including power selection circuitry 208, in accordance with the present invention. In the illustrated embodiment, the redundant power supply 200 includes a plurality of input voltage sources A–B 202–203 and the power selection circuitry 208, which is configured to connect a selected one of the voltage sources A–B 202–203 to a load 206. For example, the load 206 may comprise a DC—DC regulator or any other suitable load. The input voltage sources A–B 202–203, the power selection circuitry 208, and the load 206 are connected to a common return ("RTN") line.

As described herein, an input voltage source is deemed fully operational when it is "on", i.e., when that voltage source produces a predetermined input voltage level. For example, the predetermined input voltage level produced by the fully operational input voltage source may be about –48 volts or any other suitable input voltage level. Moreover, an input voltage source is deemed not fully operational when it is "off", i.e., when that voltage source produces a voltage level that is less than the predetermined input voltage level or when the voltage source is disconnected from the power selection circuitry.

In an illustrative mode of operation, when the voltage source A 202 is on and the voltage source B 203 is off, the power selection circuitry 208 connects the voltage source A 202 to the load 206 and disconnects the voltage source B 203 from the load 206. As a result, the power selection circuitry 208 provides an input voltage $V_{INPUT}=-V_{INA}$ to the load 206, which generates a corresponding regulated output voltage $V_{OUTPUT}$. Similarly, when the voltage source B 203 is on and the voltage source A 202 is off, the power selection circuitry 208 connects the voltage source B 203 to the load 206 and disconnects the voltage source A 202 from the load 206. As a result, the power selection circuitry 208 provides an input voltage $V_{INPUT}=-V_{INB}$ to the load 206, which generates a regulated output voltage $V_{OUTPUT}$ corresponding thereto.

FIG. 3 depicts a schematic representation 308 of the power selection circuitry 208 (see FIG. 2). As shown in FIG. 3, the power selection circuitry 308 includes a Negative Temperature Coefficient (NTC) band-gap reference 302, a symmetric resistor array 304, a comparator 306, control logic/drive circuitry 310, and a first plurality of switching transistors MA–MB 312–313. The symmetric resistor array 304 is coupled between the inputs INA–INB of the comparator 306 and the input voltage sources A–B 202–203 (see FIG. 2) providing the input voltages $-V_{INA}$ and $-V_{INB}$, respectively, to the power selection circuitry 308. The control logic/drive circuitry 310 is coupled between the output OUT of the comparator 306 and the plurality of switching transistors MA–MB 312–313. It should be appreciated that the power selection circuitry 308 may be implemented using any suitable semiconductor Integrated Circuit (IC) technology.

The switching transistors MA–MB 312–313 are configured to connect a selected one of the input voltage sources A–B 202–203 (which are operatively coupled to the $-V_{INA}$ and $-V_{INB}$ connections, respectively) to the load 206 (which is operatively coupled to the $V_{INPUT}$ connection). The comparator 306 is configured to compare the levels of the voltages $-V_{INA}$ and $-V_{INB}$ produced by the input voltage sources A–B 202–203, respectively, and to provide a voltage indicating which one of the voltage sources A–B 202–203 is on to the control logic/drive circuitry 310. The symmetric resistor array 304 in conjunction with a second plurality of switching transistors M1–M2 316–317 is configured to assure that symmetric trip voltages with hysteresis are provided at the inputs INA–INB of the comparator 306. For example, the switching transistors MA–MB 312–313 and M1–M2 316–317 may comprise respective Metal Oxide Semiconductor Field Effect Transistors (MOSFETs) such as n-channel FETs or any other suitable switching element.

Specifically, resistors R5 and R8 in series with the switching transistors M1–M2 316–317, respectively, create non-zero trip voltages at the source terminals A–B 202–203.

Each trip voltage is determined by adjusting the relative resistance between resistors R3–R5 together with the reference voltage generated by the NTC band-gap reference 302 at a circuit node 320. Assuming initially that the source terminal A 202 is connected to the load 206 and the switching transistor M2 317 is on (because only one of the switching transistors M1–M2 316–317 is on at a time, the switching transistor M1 316 is off), when the voltage at the source terminal B 203 is a trip voltage (e.g., 0.4 volts) lower than the voltage at the source terminal A 202, the output of the comparator 306 switches to a logical low level. This connects the source terminal B 203 to the load 206 and causes the switching transistors M1–M2 316–317 to be on and off, respectively. The resistance difference between the two circuit branches to the source terminals A–B 202–203 formed by activating the switch M1 316 and by deactivating the switch M2 317 creates a hysteresis voltage, which aids in avoiding unwanted switching in noisy applications. In the presently disclosed embodiment, the hysteresis voltage is set by suitably adjusting the reference voltage produced by the NTC band-gap reference 302. In the event the voltage at the source terminal B 203 is a trip voltage (e.g., 0.4 volts) higher than the voltage at the source terminal A 202, thereby overcoming the hysteresis voltage, the comparator 306 switches to a logical high level, causing the source terminal A 202 to be connected to the load 206 and the switching transistors M1–M2 316–317 to be off and on, respectively.

The control logic/drive circuitry 310 is configured to determine which input voltage source A–B 202–203 is on based on the voltage provided to it by the comparator 306, and to apply respective control signals to the switching transistors MA–MB 312–313 to connect that input voltage source to the load 206. The trip voltage is selected such that the parasitic body diodes of the switching transistors MA–MB 312–313 will not be turned on. It is noted that the body diode forward voltage typically has a negative temperature coefficient. The NTC band-gap reference 302 is configured to track the diode voltage drop of the parasitic body diodes to assure that the power selection circuitry 308 satisfies the NTC trip voltage requirements of the switching transistors MA–MB 312–313 over temperature. Because the hysteresis voltage is set by the NTC band-gap reference 302, the hysteresis voltage also tracks the diode voltage drop of the parasitic body diodes. Further, because the body diode forward voltage has a negative temperature coefficient, the hysteresis voltage also has a negative temperature coefficient, e.g., the hysteresis decreases with increasing temperature.

Specifically, the NTC band-gap reference 302 comprises three bipolar transistors Q0–Q2 and three resistors R0–R2. A diode D0 included in the NTC band-gap reference 302 is used to compensate for the temperature effect associated with the blocking diodes D1–D2 314–315. It is noted that conventional band-gap references are typically configured to sum a voltage having a negative temperature coefficient with a voltage having a positive temperature coefficient to produce a reference voltage having a zero temperature coefficient. In contrast, the operation of the NTC band-gap reference 302 is based on the resistance ratio of the resistors R1–R2 and the area ratio of the bipolar transistors Q0–Q2, which are employed to produce a reference voltage having a generally more predictable negative temperature coefficient. It is noted that the NTC reference voltage produced at the circuit node 320 is common with respect to both of the sources A–B 202–203.

As shown in FIG. 3, the symmetric resistor array 304 includes the plurality of resistors R3–R8. The resistors R3–R4 are serially connected between the circuit node 320 and the input voltage connection $-V_{INA}$, and the resistors R6–R7 are serially connected between the circuit node 320 and the input voltage connection $-V_{INB}$. The common node of the resistors R3–R4 is connected to the inverting input INB of the comparator 306, and the common node of the resistors R6–R7 is connected to the non-inverting input INA of the comparator 306. The resistor R5 is connected to the source of the switching transistor M1 316, and the resistor R5 and the switching transistor M1 316 are connected in parallel with the resistor R3. Similarly, the resistor R8 is connected to the source of the switching transistor M2 317, and the resistor R8 and the switching transistor M2 317 are connected in parallel with the resistor R6. The comparator 306 applies its output OUT directly to the gate of the switching transistor M2 317, and applies an inverted form of its output OUT to the gate of the switching transistor M1 316 via an inverter 307. In this way, the values of the resistors connected in series with the respective resistors R4 and R7 are suitably varied to implement the symmetric trip voltages at the inputs INA–INB of the comparator 306. It is noted that the resistors R5 and R8 are operative to assure that the symmetric trip voltages are provided to the comparator 306 with hysteresis.

It is noted that the diode D1 314 is connected between the circuit node 320 and the common node of the resistor R3 and the switching transistor M1 316, and the diode D2 315 is connected between the circuit node 320 and the common node of the resistor R6 and the switching transistor M2 317, to block the cross-conduction of current between the input voltage sources A–B 202–203 (see FIG. 2) through the symmetric resistor array 304. Specifically, when the voltage source A 202 is on and the voltage source B 203 is off, the diode D2 315 is back-biased, thereby preventing current from flowing from the voltage source B 203. Similarly, when the voltage source B 203 is on and the voltage source A 202 is off, the diode D1 314 is back-biased to prevent current from flowing from the voltage source A 202.

As further shown in FIG. 3, the NTC band-gap reference 302 includes the plurality of resistors R0–R2, the plurality of transistors Q0–Q2, and the diode D0. For example, the transistors Q0–Q2 may comprise respective Bipolar Junction Transistors (BJTs) such as npn BJTs or any other suitable type of transistor. The collector of the transistor Q is connected to the base of the transistor Q1, and the collector of the transistor Q1 is connected to the base of the transistor Q2. Further, the base and the collector of the transistor Q0 are connected to each other. The resistor R0 is connected between the circuit node 320 and the common node of the transistors Q0–Q1, and the resistor R1 is connected between the circuit node 320 and the common node of the transistors Q1–Q2. The emitter of the transistor Q0 is connected to the emitter of the transistor Q2, and the resistor R2 is connected between the emitter of the transistor Q1 and the common node of the transistors Q0 and Q2. The collector of the transistor Q2 is connected to the circuit node 320, and the diode D0 is connected between the common node of the transistors Q0 and Q2 and a circuit node 330, which comprises the substrate of the IC.

As described above, the NTC band-gap reference 302 is configured to track the temperature coefficients of the switching transistors MA–MB 312–313. Specifically, the NTC band-gap reference 302 tracks the temperature coefficient of the body diodes (not shown) of the switching transistors MA–MB 312–313. Those of ordinary skill in this art will appreciate that the temperature coefficient of the body diode of a MOSFET may be determined from the body diode's forward voltage, which varies with temperature. As explained above, the desired negative temperature coefficient is obtained by adjusting the ratio of the values of resistors R1–R2 included in the NTC band-gap reference 302. Further, the diode D0 is substantially identical to the diodes D1–D2 and therefore their respective temperature coefficients essentially cancel one another. It is noted that a switching transistor M3 332 may be employed to control the application of the input voltage $V_{INPUT}$ to the load 206.

Figure 4:
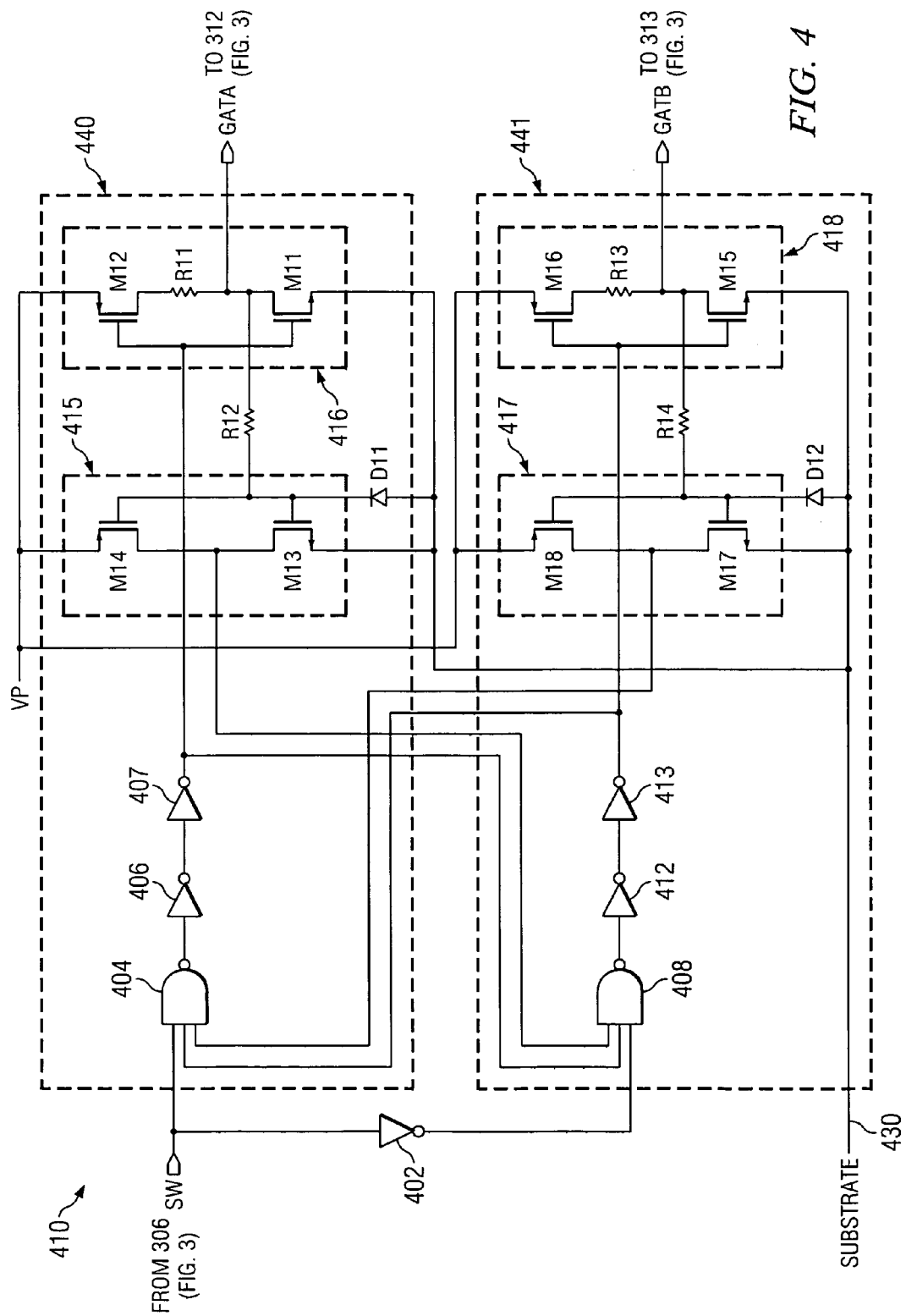
FIG. 4 is a schematic of control logic/drive circuitry included in the power selection circuitry of FIG. 2.

FIG. 4 depicts a schematic representation 410 of the control logic/drive circuitry 310 (see FIG. 3). As shown in FIG. 4, the control logic/drive circuitry 410 comprises cross-coupled logic circuits 440–441. The logic circuit 440 includes a NAND gate 404, and inverters 406–407 and 415–416. The logic circuit 441 includes a NAND gate 408, and inverters 412–413 and 417–418. As described above, the control logic/drive circuitry 410 is configured to determine which one of the input voltage sources A–B 202–203 (see FIG. 2) is "on", and to apply control signals to the switching transistors MA–MB 312–313 (see FIG. 3) to connect that input voltage source to the load. Specifically, the control logic/drive circuitry 410 applies respective adaptive non-overlapping control signals to the switching transistors MA–MB 312–313 to assure that the switching transistor connecting the operational input voltage source to the load is activated only when the other switching transistor is fully deactivated. In this way, the cross-conduction of current between the input voltage sources A–B 202–203 through the switching transistors MA–MB 312–313 is blocked. In the presently disclosed embodiment, the switching transistors MA–MB 312–313 are activated when logical high voltage levels are applied to their respective gates.

As shown in FIG. 4, the input SW of the control logic/drive circuitry 410 is connected to the input A of the NAND gate 404, and an inverted form of the input SW is provided to the input A of the NAND gate 408 via an inverter 402. Because the control signals at the inputs A of the NAND gates 404 and 408 undergo an even number of inversions as they propagate to the outputs GATA–GATB of the control logic/drive circuitry 410, the same logical voltage levels at the inputs A of the NAND gates 404 and 408 appear at the outputs GATA–GATB, respectively. In the illustrated embodiment, the NAND gates 404 and 408 produce inverted forms of the control signals at their respective inputs A when logical high voltage levels are applied to their respective inputs B–C. Otherwise, the outputs of the NAND gates 404 and 408 remain at logical high voltage levels, thereby causing logical low voltage levels to be produced at the outputs GATA–GATB to deactivate the switching transistors MA–MB 312–313.

For example, in the event a logical high level is provided to the input SW of the control logic/drive circuitry 410, the logical high level is applied to the input A of the NAND gate 404 and a logical low level is applied to the input A of the NAND gate 408. The inverter 413 therefore generates a logical high level, which is applied to the input C of the NAND gate 404; and, the inverter 407 therefore generates a logical low level, which is applied to the input C of the NAND gate 408. Further, when the logical low level at the input A of the NAND gate 408 propagates to the output GATB, the inverter 417 generates a logical high level, which is applied to the input B of the NAND gate 404. Similarly, when the logical high level at the input A of the NAND gate 404 propagates to the output GATA, the inverter 415 generates a logical low level, which is applied to the input B of the NAND gate 408.

As a result, the logical high levels applied to the inputs B–C of the NAND gate 404 effectively enable the NAND gate 404, thereby allowing the logical high level at the input A to propagate to the output GATA to activate the switching transistor MA 312 (see FIG. 3). Further, the logical low levels applied to the inputs B–C of the NAND gate 408 effectively disable the NAND gate 408, thereby causing a logical low level to appear at the output GATB to deactivate the switching transistor MB 313.

The inverters 415–418 are configured to assure that the control signals applied to the switching transistors MA–MB via the GATA–GATB connections, respectively, are non-overlapping. As a result, the switching transistor MA 312 is activated only when the switching transistor MB 313 is fully deactivated, and the switching transistor MB 313 is activated only when the switching transistor MA 312 is fully deactivated. In this way, the cross-conduction of current between the input voltage sources A–B 202–203 (see FIG. 2) is blocked through the switching transistors MA–MB 312–313 (see FIG. 3).

The above-described adaptive non-overlapping mechanism is implemented by sensing the voltage levels at the outputs GATA–GATB directly through the inverters 415–418, each of which has relatively strong pull-down and relatively weak pull-up characteristics. It is noted that as the size of the switching transistors MA–MB 312–313 is increased (for lower on-resistance), the amount of time needed for discharging the gates of the switching transistors MA–MB 312–313 increases. The adaptive non-overlapping mechanism is implemented by monitoring the gate voltages at the outputs GATA–GATB through the inverters 415 and 417 and by feeding the voltages back to the NAND gates 404 and 408. Regardless of the size of the switching transistors MA–MB 312–313, the control circuit adaptively waits for one of the outputs GATA–GATB to be fully discharged (i.e., one of the switching transistors MA–MB 312–313 to be fully deactivated) before charging/activating the other one. The strong pull-down and weak pull-up characteristics of the inverters 415 and 417 are provided to make sure that the voltages at the outputs GATA–GATB are lower than the threshold voltage of the switching transistors MA–MB 312–313 during the deactivating period, thereby assuring non-overlapping logic within the control circuit and non-conduction between the source terminals A–B 202–203. It should be noted that the diode and resistor network connected into the inputs of the inverters 415 and 417 are provided for Electro-Static Discharge (ESD) purposes.

In the illustrated embodiment, each of the inverters 415–418 includes an n-channel FET pull-down device having a suitable large aspect ratio W/L, and a p-channel FET pull-up device having a suitable small aspect ratio W/L. The respective sources of the n-channel FET pull-down devices, i.e., transistors M11, M13, M15, and M17, are connected to a circuit node 430, which comprises the substrate of the IC. It is noted that switching load current spikes are reduced by the weak pull-up gate outputs provided by p-channel FETs M12 and M16 of the inverters 416 and 418, respectively. In an alternative embodiment, the p-channel FETs M12 and M16 may be implemented by small current sources. The strong pull-down implemented by n-channel FETs M11 and M15 in the inverters 416 and 418 provides a fast deactivating period to minimize downtime during power selection switching.

The illustrative embodiment disclosed herein will be better understood with reference to the following example. In this example, it is first assumed that the voltage source A 202 (see FIG. 2) produces a predetermined input voltage level of $-V_{INA}=-48$ volts and the voltage source B 203 (see FIG. 2) provides a voltage level of $-V_{INB}=0$ volts, i.e., the voltage source A 202 is "on" and the voltage source B 203 is "off". The voltage at the non-inverting input INA is therefore greater than the voltage at the inverting input INB of the comparator 306 (see FIG. 3), and the comparator 306 provides a logical high level to the input SW of the control logic/drive circuitry 310. As a result, the control logic/drive circuitry 310 provides a logical high level at its output GATA and a logical low level at its output GATB, thereby activating the switching transistor MA 312 after deactivating the switching transistor MB 313. Accordingly, a path is created for the power selection circuitry 208 (see FIG. 2) to provide the input voltage $V_{INPUT}=-V_{INA}=-48$ volts to the load 206 (see FIG. 2).

Next, it is assumed that the voltage source B 203 produces a predetermined input voltage level of $-V_{INB}=-48$ volts and the voltage source A 202 provides a voltage level of $-V_{INA}=0$ volts, i.e., the voltage source B 203 is "on" and the voltage source A 202 is "off". The voltage at the inverting input INB is therefore greater than the voltage at the non-inverting input INA of the comparator 306, which then provides a logical low level to the input SW of the control logic/drive circuitry 310. As a result, the control logic/drive circuitry 310 provides a logical low level at its output GATA and a logical high level at its output GATB, thereby deactivating the switching transistor MA 312 and activating the switching transistor MB 313. Accordingly, a path is created for the power selection circuitry 208 to provide the input voltage $V_{INPUT}=-V_{INB}=-48$ volts to the load 206.

A method of operating the presently disclosed power selection circuitry is illustrated by reference to FIG. 5. As depicted in step 502, first and second input voltage sources provide respective input voltage levels to a comparator via a symmetric resistor array. The comparator then compares, as depicted in step 504, the respective input voltage levels and provides, as depicted in step 506, a voltage indicating which one of the input voltage sources is on to control logic/drive circuitry. Next, a decision is made, as depicted in step 508, as to whether the first input voltage source is on and the second input voltage source is off. In the event the first voltage source is on and the second voltage source is off, the control logic/drive circuitry deactivates, as depicted in step 510, a second switching element to disconnect the second voltage source from a load, and then activates, as depicted in step 512, a first switching element to create a path connecting the first voltage source to the load. Otherwise, the control logic/drive circuitry deactivates, as depicted in step 514, the first switching element to disconnect the first voltage source from the load, and activates, as depicted in step 516, the second switching element to connect the second voltage source to the load. The method then loops back to step 502 and optionally repeats.

It is appreciated that the presently disclosed power selection circuitry may be employed in a redundant power supply (1) to block the cross-conduction of current between multiple input voltage sources, (2) to reduce load current spikes during power selection switching, and (3) to satisfy NTC trip voltage requirements of switching elements selectively connecting the input voltage sources to a load. It is understood, however, that the disclosed power selection circuitry may also be employed in other suitable electrical and electronic devices. Moreover, the circuit configuration of the power selection circuitry described herein is both compact and symmetrical, thereby facilitating its implementation in an IC chip.

It will further be appreciated by those of ordinary skill in the art that modifications to and variations of the above-described cross-conduction blocked power selection comparison/control circuitry with NTC (Negative Temperature Coefficient) trip voltage may be made without departing from the inventive concepts disclosed herein. Accordingly, the invention should not be viewed as limited except as by the scope and spirit of the appended claims.

What is claimed is:

1. A power selection circuit for use with a plurality of voltage sources, comprising:

a comparator configured to compare a first voltage provided by a first voltage source with a second voltage provided by a second voltage source;

control circuitry including cross-coupled logic circuits having only a first and second logic level each having a fixed voltage level having first and second outputs, the cross-coupled logic circuits being configured, in the event the first voltage is greater than the second voltage, to provide said first logic level at the first output and said second logic level at the second output, and, in the event the second voltage is greater than the first voltage, to provide the second logic level at the first output and the first logic level at the second output, the second logic level being opposite to the first logic level; and first and second switching elements, the first switching element being configured to provide the first voltage as an output voltage when the first logic level is provided at the first output, and the second switching element being configured to provide the second voltage as the output voltage when the first logic level is provided at the second output.

2. The power selection circuit of claim 1 wherein the cross-coupled logic circuits are configured to provide non-overlapping first and second logic levels to block cross-conduction of current between the first and second voltage sources through the cross-coupled logic circuits.

3. The power selection circuit of claim 1 wherein the cross-coupled logic circuits each include at least one logic gate configured to provide the first and second logic levels to the first and second outputs, each logic gate having pull-down and pull-up switching transistors with respective aspect ratios, wherein the aspect ratio of the pull-down switching transistor is greater than the aspect ratio of the pull-up switching transistor, thereby reducing current spikes when providing the first and second logic levels.

4. A power selection circuit for use with a plurality of voltage sources, comprising:

a comparator configured to compare a first voltage provided by a first voltage source with a second voltage provided by a second voltage source;

control circuitry including cross-coupled logic circuits having first and second outputs, the cross-coupled logic circuits being configured, in the event the first voltage is greater than the second voltage, to provide a first logic level at the first output and a second logic level at the second output, and, in the event the second voltage is greater than the first voltage, to provide the second logic level at the first output and the first logic level at the second output, the second logic level being opposite to the first logic level; and first and second switching elements, the first switching element being configured to provide the first voltage as an output voltage when the first logic level is provided at the first output, and the second switching element being configured to provide the second voltage as the output voltage when the first logic level is provided at the second output, further comprising a resistor array including at least two first resistors and at least two second resistors, the first resistors being connected in series between the first voltage and a first node of the circuit and the second resistors being connected in series between the second voltage and the first circuit node, common nodes of the first and second resistors being connected to first and second inputs, respectively, of the comparator, the resistor array being configured to provide symmetric trip voltages to the comparator inputs.

5. The power selection circuit of claim 4 wherein the resistor array is configured to vary the values of at least one of the first resistors and at least one of the second resistors based on an output level of the comparator to assure that the symmetric trip voltages are provided to the comparator with hysteresis.

6. The power selection circuit of claim 4 further including a first diode connected in series with the first resistors and a second diode connected in series with the second resistors, the first diode being back-biased when the second voltage is greater than the first voltage and the second diode being back-biased when the first voltage is greater than the second voltage, thereby blocking cross-conduction of current between the first and second voltage sources through the resistor array.

7. A power selection circuit for use with a plurality of voltage sources, comprising:
 a comparator configured to compare a first voltage provided by a first voltage source with a second voltage provided by a second voltage source;
 control circuitry including cross-coupled logic circuits having first and second outputs, the cross-coupled logic circuits being configured, in the event the first voltage is greater than the second voltage, to provide a first logic level at the first output and a second logic level at the second output, and, in the event the second voltage is greater than the first voltage, to provide the second logic level at the first output and the first logic level at the second output, the second logic level being opposite to the first logic level; and
 first and second switching elements, the first switching element being configured to provide the first voltage as an output voltage when the first logic level is provided at the first output, and the second switching element being configured to provide the second voltage as the output voltage when the first logic level is provided at the second output,
 wherein the first and second switching elements have associated negative temperature coefficients, and the power selection circuit further includes a band-gap reference configured to track the negative temperature coefficients associated with the first and second switching elements.

8. A method of operating a power selection circuit usable with a plurality of voltage sources, comprising the steps of:
 comparing a first voltage provided by a first voltage source with a second voltage provided by a second voltage source by a comparator;
 in the event the first voltage is greater than the second voltage, providing a first logic level at a first output and a second logic level at a second output by control circuitry including cross-coupled logic circuits having only a first and second logic level each having a fixed voltage level;
 in the event the second voltage is greater than the first voltage, providing the second logic level at the first output and the first logic level at the second output by the control circuitry including the cross-coupled logic circuits, the second logic level being opposite to the first logic level;
 providing the first voltage as an output voltage when the first logic level is provided at the first output by a first switching element; and
 providing the second voltage as the output voltage when the first logic level is provided at the second output by a second switching element.

9. The method of claim 8 wherein the first and second logic levels provided at the first and second outputs in the first and second providing steps are non-overlapping, thereby blocking cross-conduction of current between the first and second voltage sources through the cross-coupled logic circuits.

10. The method of claim 8 wherein each of the first and second providing steps includes providing the first and second logic levels to the first and second outputs by respective logic gates included in the cross-coupled logic circuits, each logic gate having pull-down and pull-up switching transistors with respective aspect ratios, wherein the aspect ratio of the pull-down switching transistor is greater than the aspect ratio of the pull-up switching transistor, thereby reducing current spikes when providing the first and second logic levels.

11. A method of operating a power selection circuit usable with a plurality of voltage sources, comprising the steps of:
 comparing a first voltage provided by a first voltage source with a second voltage provided by a second voltage source by a comparator;
 in the event the first voltage is greater than the second voltage, providing a first logic level at a first output and a second logic level at a second output by control circuitry including cross-coupled logic circuits;
 in the event the second voltage is greater than the first voltage, providing the second logic level at the first output and the first logic level at the second output by the control circuitry including the cross-coupled logic circuits, the second logic level being opposite to the first logic level;
 providing the first voltage as an output voltage when the first logic level is provided at the first output by a first switching element; and
 providing the second voltage as the output voltage when the first logic level is provided at the second output by a second switching element,
 further including the step of providing symmetric trip voltages to first and second inputs of the comparator by a resistor array, the resistor array including at least two first resistors and at least two second resistors, the first resistors being connected in series between the first voltage and a first node of the circuit and the second resistors being connected in series between the second voltage and the first circuit node, and common nodes of the first and second resistors being connected to the first and second inputs, respectively, of the comparator.

12. The method of claim 11 wherein the fifth providing step includes varying the values of at least one of the first resistors and at least one of the second resistors based on an output level of the comparator by the resistor array to assure that the symmetric trip voltages are provided to the comparator with hysteresis.

13. The method of claim 11 further including the step of blocking cross-conduction of current between the first and second voltage sources through the resistor array by first and second diodes, the first diode being connected in series with the first resistors and the second diode being connected in series with the second resistors, and the first diode being back-biased when the second voltage is greater than the first voltage and the second diode being back-biased when the first voltage is greater than the second voltage.

14. A method of operating a power selection circuit usable with a plurality of voltage sources, comprising the steps of:
comparing a first voltage provided by a first voltage source with a second voltage provided by a second voltage source by a comparator;
in the event the first voltage is greater than the second voltage, providing a first logic level at a first output and a second logic level at a second output by control circuitry including cross-coupled logic circuits;
in the event the second voltage is greater than the first voltage, providing the second logic level at the first output and the first logic level at the second output by the control circuitry including the cross-coupled logic circuits, the second logic level being opposite to the first logic level;
providing the first voltage as an output voltage when the first logic level is provided at the first output by a first switching element; and
providing the second voltage as the output voltage when the first logic level is provided at the second output by a second switching element,
further including the step of tracking negative temperature coefficients associated with the first and second switching elements by a band-gap reference.

15. A power selection circuit for use with a plurality of voltage sources, comprising:
a comparator configured to compare a first voltage provided by a first voltage source with a second voltage provided by a second voltage source, the first and second voltages being provided with hysteresis having a negative temperature coefficient; and
output circuitry configured to provide the first voltage as an output voltage in the event the first voltage is greater than the second voltage, and to provide the second voltage as the output voltage in the event the second voltage is greater than the first voltage.

16. The power selection circuit of claim 15 wherein the first and second voltages comprise symmetric trip voltages.

17. A power selection circuit for use with a plurality of voltage sources, comprising:
a comparator configured to compare a first voltage provided by a first voltage source with a second voltage provided by a second voltage source, the first and second voltages being provided with hysteresis having a negative temperature coefficient; and
output circuitry configured to provide the first voltage as an output voltage in the event the first voltage is greater than the second voltage, and to provide the second voltage as the output voltage in the event the second voltage is greater than the first voltage,
further comprising a resistor array including at least two first resistors and at least two second resistors, the first resistors being connected in series between the first voltage and a first node of the circuit and the second resistors being connected in series between the second voltage and the first circuit node, common nodes of the first and second resistors being connected to first and second inputs, respectively, of the comparator, the resistor array being configured to provide symmetric trip voltages corresponding to the first and second voltages to the comparator inputs.

18. The power selection circuit of claim 17 wherein the resistor array is configured to vary the values of at least one of the first resistors and at least one of the second resistors based on an output level of the comparator to assure that the symmetric trip voltages are provided to the comparator with hysteresis.

19. A method of operating a power selection circuit usable with a plurality of voltage sources, comprising the steps of:
comparing a first voltage provided by a first voltage source with a second voltage provided by a second voltage source by a comparator, the first and second voltages being provided with hysteresis having a negative temperature coefficient;
in the event the first voltage is greater than the second voltage, providing the first voltage as an output voltage by output circuitry; and
in the event the second voltage is greater than the first voltage, providing the second voltage as the output voltage by the output circuitry.

20. The method of claim 19 further including the step of providing symmetric trip voltages corresponding to the first and second voltages to the comparator inputs.

21. A power selection circuit for use with a plurality of voltage sources, comprising:
a comparator configured to compare a first voltage provided by a first voltage source with a second voltage provided by a second voltage source, the first and second voltages being provided with hysteresis having a predetermined magnitude;
a band-gap reference configured to set the magnitude of the hysteresis; and
output circuitry configured to provide the first voltage as an output voltage in the event the first voltage is greater than the second voltage, and to provide the second voltage as the output voltage in the event the second voltage is greater than the first voltage.

22. A method of operating a power selection circuit usable with a plurality of voltage sources, comprising the steps of:
comparing a first voltage provided by a first voltage source with a second voltage provided by a second voltage source by a comparator, the first and second voltages being provided with hysteresis having a predetermined magnitude;
setting the magnitude of the hysteresis by a band-gap reference;
in the event the first voltage is greater than the second voltage, providing the first voltage as an output voltage by output circuitry; and
in the event the second voltage is greater than the first voltage, providing the second voltage as the output voltage by the output circuitry.

23. A power selection circuit for use with a plurality of voltage sources, comprising:
a comparator configured to compare a first voltage provided by a first voltage source with a second voltage provided by a second voltage source;
control circuitry having only a first and second logic level having each having a fixed voltage level first and second outputs, the control circuitry being configured, in the event the first voltage is greater than the second voltage, to provide said first logic level at the first output and said second logic level at the second output, and, in the event the second voltage is greater than the first voltage, to provide the second logic level at the first output and the first logic level at the second output, the second logic level being opposite to the first logic level, the first and second logic levels being non-overlapping to block cross-conduction of current between the first and second voltage sources through the control circuitry; and output circuitry configured to provide the first voltage as an output voltage when the first logic level is provided at the first output, and to provide the second voltage as the output voltage when the first logic level is provided at the second output.

24. A method of operating a power selection circuit usable with a plurality of voltage sources, comprising the steps of:

comparing a first voltage provided by a first voltage source with a second voltage provided by a second voltage source by a comparator;

in the event the first voltage is greater than the second voltage, providing a first logic level at a first output and a second logic level at a second output by control circuitry having only a first and second logic level each having a fixed voltage level;

in the event the second voltage is greater than the first voltage, providing the second logic level at the first output and the first logic level at the second output by the control circuitry, the second logic level being opposite to the first logic level, the first and second logic levels being non-overlapping to block cross-conduction of current between the first and second voltage sources through the control circuitry; and providing the first voltage as an output voltage when the first logic level is provided at the first output and providing the second voltage as the output voltage when the first logic level is provided at the second output by output circuitry.

* * * * *